March 18, 1969

A. H. BOESE 3,432,962

AERIAL TOY

Filed Oct. 24, 1965

INVENTOR.
ARTHUR H. BOESE

BY
*Dunlap and Janey*
ATTORNEYS

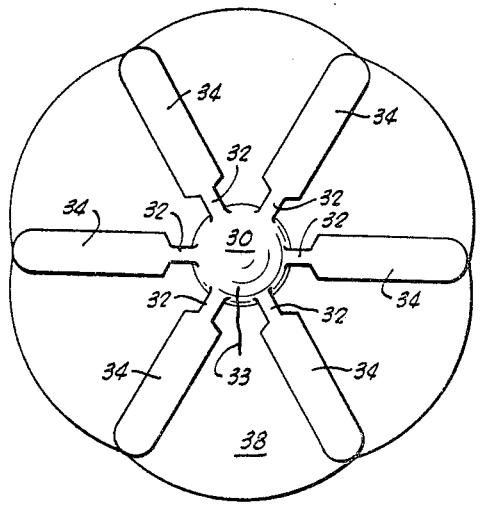
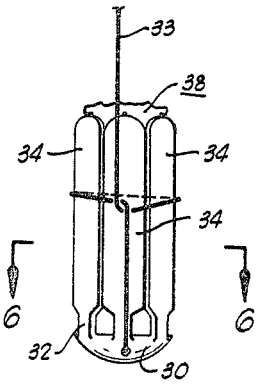
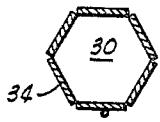
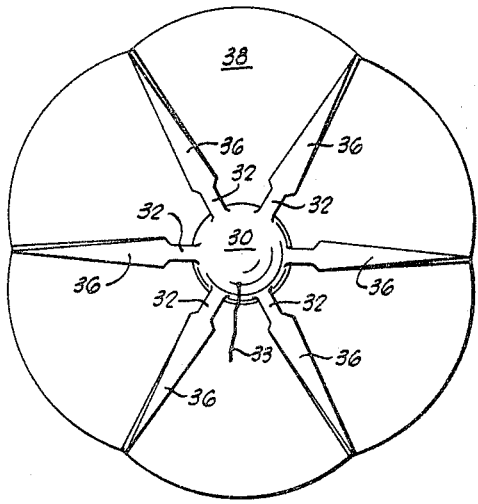
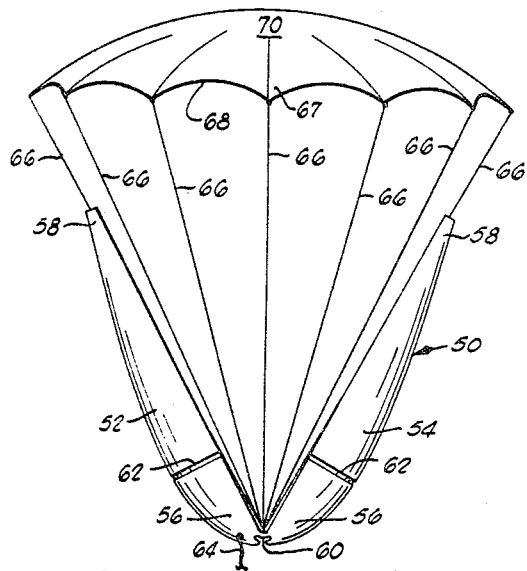

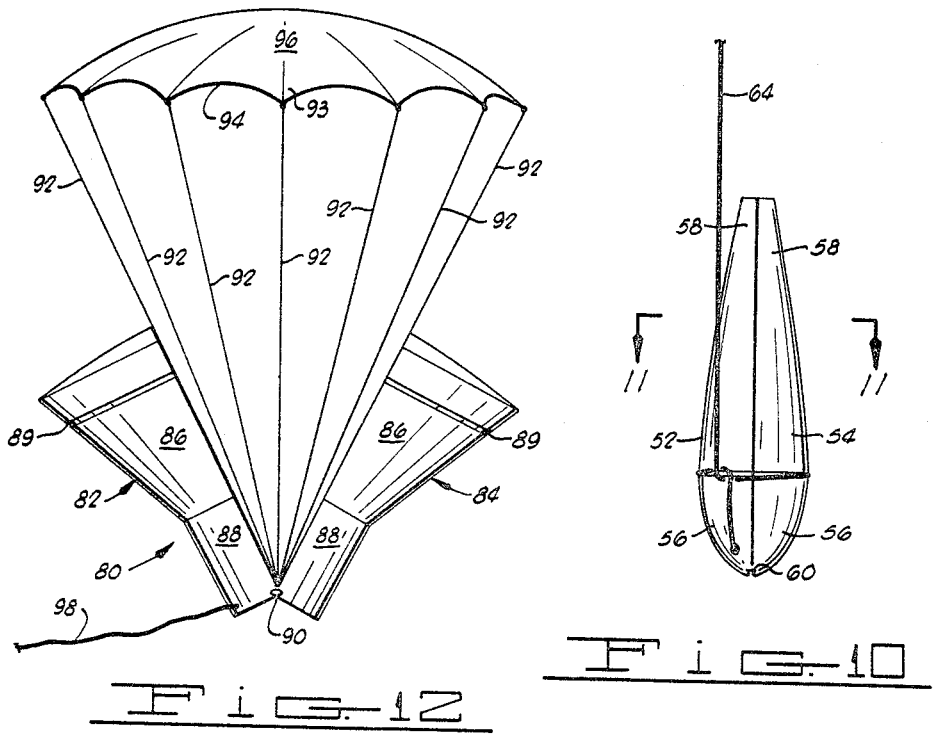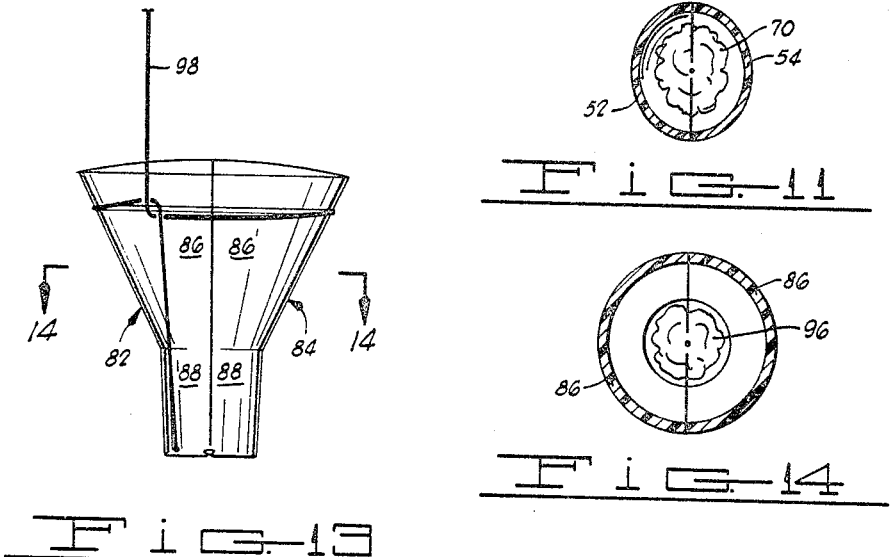

INVENTOR.
ARTHUR H. BOESE
BY
Dunlap and Laney
ATTORNEYS

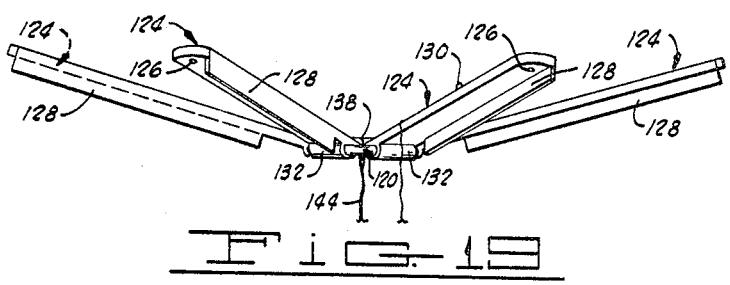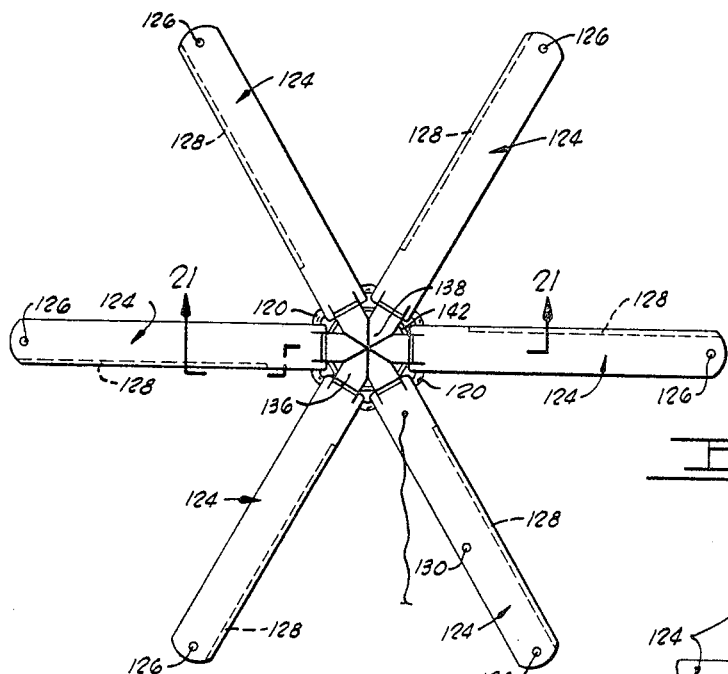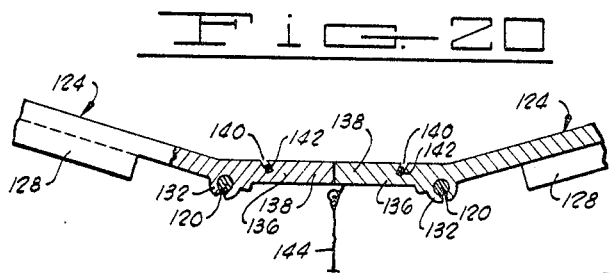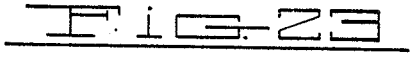

3,432,962
AERIAL TOY
Arthur H. Boese, 1205 N. Utah, Oklahoma City,
Okla. 73107
Filed Oct. 24, 1965, Ser. No. 504,313
U.S. Cl. 46—86          2 Claims
Int. Cl. A63h 33/20

ABSTRACT OF THE DISCLOSURE

An aerial top having a base, shrouds resiliently hinged to the base and movable from a relaxed, divergent status to a parallel, resiliently deformed status; a canopy secured to the shrouds and spaced from the base; and a flexible launching member secured to the base and of a length permitting it to be wrapped around the shrouds when they are parallel, and then extended past the ends of the shrouds connected to the canopy. The toy is launched by grasping the free end of the launching member, swinging the toy in an arc, and releasing it upwardly.

---

This invention relates to aerial toys of the type, such as parachutes, which depend upon the resistance of the air to the movement of a body therethrough to cause the body to function in a desired manner. More particularly, but not by way of limitation, the invention relates to hand-launched toy devices which can be thrown or catapulted to a great height in the air, and which then automatically change their form so as to provide an increase in the surface area subjected to contact with the air, and thereby be effectively decelerated during their descent.

A great number of devices of all forms and shapes have been heretofore contrived for the purpose of braking or decelerating the descent of a body falling through the air of the earth's atmosphere under a gravitational influence. Some of these devices have been intended for, and found widespread use as, clever and attractive toys for children which simulate actual parachutes, space capsules or rockets in their appearance and in their response to the air resistance as they descend to the earth. As in the case of any toy, it is highly desirable that such devices be relatively simple in construction, sturdy and capable of withstanding a considerable amount of abuse and misuse, and easily operated by the ordinary child falling within an age span of the greatest possible breadth. In the case of toy parachutes and similar devices which are to be thrown upwardly into the air, and which then open at or near the apex or zenith of their trajectory, it is essential that the toy rarely malfunction so that confidence in its repeated and continued operability can be maintained.

The present invention provides a very simple, yet highly effective aerial toy which is rugged in construction and can be depended on to operate successfully each time it is utilized. The toy has a minimum number of moving parts, can be constructed for a very low cost, and can be made in various shapes to accommodate the interests of various children.

Broadly described, the present invention comprises a segmented or multipart body having the several segments or parts thereof joined to each other by means biasing the several body parts to an expanded or divergent position in which the parts occupy and include between them a relatively large total volume, the parts being configured so that they may be folded against said bias into a compact, adjacent relationship. The toy can further include flexible canopy means in the nature of a parachute or air resistive surface which can be permanently or detachably joined to the multipart body, preferably in a symmetrical fashion. As a final element of the toy, a flexible launching member secured to one of the parts of the body and being of a length such that the flexible launching member may be extended across at least two of the segments or parts of the body when they are in their collapsed, adjacent position of minimum volume. Stated differently, the flexible launching member should be long enough to interconnect at least two of the body parts when they are in their collapsed, closely adjacent position by extending across any space intervening between such two parts at this time. It should be further pointed out that the configuration and arrangement of the several parts of the body relative to the biasing means by which the parts are joined to each other is such that when the parts are folded into their collapsed, adjacent positions, the flexible launching member which is provided can be wrapped at least partially around the parts in a position such that the biasing means tends to expand and release the flexible member as said parts are moved divergently with respect to each other under said biasing influence.

To more specifically characterize the invention, without being intended to be limited to such specific characterization, one embodiment of the invention takes the form of a parachute-like structure which has a body including a base member provided at one end thereof, and a plurality of elongated shroud members connected to said base member by resilient hinge means and extending divergently outwardly and upwardly therefrom. At the opposite ends of the shroud members from their ends connected to the base member, a flexible canopy member is secured to the several shroud members. A flexible launching line or cord is secured at one of its ends to the base member, or to one of the shroud members, and is preferably of a length sufficient to be extended around the several shroud members when they are collapsed to a compact, adjacent relationship approaching parallelism with the flexible canopy member disposed within, and surrounded by the several shroud members. The flexible launching member may carry at one end thereof a handle, which can conveniently take the form of a human parachutist or aviator, and which is used for launching the toy.

In the launching process, the shroud members are first collapsed against the bias of their respective resilient hinge means to a convergent or adjacent position, with the flexible canopy enclosed in and surrounded by the shroud members. The elongated, flexible launching member is then wrapped at least partially around the shroud members and secured in such wrapped around status by the use of a half hitch, or by a retaining stud carried on one of the shroud members, or by a slot formed in one of the shroud members. The free end of the elongated flexible launching member is then extended away from the half hitch, stud or slot in a direction opposite the direction of extension of the other end thereof which is secured to the base member. By grasping the free end of the flexible launching member, the toy may then be launched by swinging it around in a circle and finally releasing it when sufficient rotational speed has been achieved, the release, of course, being effected at a point in the arc of the swing to launch the toy upwardly by centrifugal force. If desired, the flexible launching member may be made of a resilient material to give a snap to the launching and cause the toy to attain a greater height.

The upward momentum of the toy is enhanced by the disposition of a substantial part of the weight thereof in the base portion which is the uppermost or leading portion of the toy as it travels upwardly. Also, the collapsed or folded position of the shroud members offers a minimum of resistance to the air during the upward travel of the toy. The net result of this construction and configuration is that the toy can achieve a relatively great height before its upward travel is overcome by gravity.

At approximately the apex or zenith of its upward flight, the bias exerted on the shroud members by the flexible hinge portions thereof tends to move the shroud members outwardly into a generally conical overall configuration. This diverging motion of the shroud members easily overcomes the small frictional resistance offered by the half hitch which is holding the convolution of the elongated flexible launching member around the folded shrouds, and causes the flexible launching member to fall away from the shrouds and cease to exert a restraining force. Substantially the same action occurs where a retaining stud or notch is provided on one of the shrouds.

As the shrouds diverge outwardly from each other and assume their generally conical configuration, the flexible canopy member, where one is employed, is expanded outwardly. Concurrently with the expansion of the shroud members and the opening of the canopy member, the toy commences its downward descent. With the opening of the shroud members, however, a substantial resistance to movement through the air is afforded by the toy and it drifts slowly downwardly to the ground, simulating a real parachute in its movement. The number of convolutions or tightness of wrap of the launching member around the collapsed or folded shrouds will determine at what point in the upward travel of the toy the shrouds will be released to their expanded positions.

Several other specific embodiments of the invention relying upon the general principles described above are envisioned and can be constructed with equal simplicity and with equal reliability in operation. Some of these will be described in greater detail in the detailed description of the invention which follows hereinafter.

From the foregoing description of the invention, it will have become apparent that it is an important object of the invention to provide an improved aerial toy or amusement device which functions reliably in repeated and extended use.

A further object of the invention is to provide an aerial toy relying upon air resistance for its operation, and which may be launched by hand with a minimum of effort.

Another object of the present invention is to provide an aerial toy or amusement device which has relatively few moving parts, can be predominantly constructed of a molded plastic, and which is sturdy and characterized by a long and trouble-free operating life.

A further object of the invention is to provide a parachute-type aerial toy which can be manually launched to a great height, and which functions to develop a substantial resistance to passage through the air during its downward descent.

Additional objects and advantages of the invention will become apparent as the following detailed description thereof is read in conjunction with the accompanying drawings which illustrate the invention.

In the drawings:

FIGURE 4 is a bottom view of a different embodiment of the invention from that shown in FIGURES 1 and 2 illustrating the different embodiment as it appears from directly below the toy when the toy is in its expanded state and is descending to the earth.

FIGURE 5 is a view in elevation of the embodiment of the toy illustrated in FIGURE 4 as the toy appears when it is in its collapsed state preparatory to launching and utilizing a half hitch in the elongated flexible launching member for retaining the toy in the collapsed state.

FIGURE 6 is a sectional view taken along line 6—6 of FIGURE 5.

FIGURE 8 is a bottom view of the embodiment of the toy shown in FIGURE 7 as it appears when viewed from the ground during the descent of the toy.

FIGURE 9 is a view in elevation of yet another embodiment of the toy as it appears when the toy is descending through the air to the earth.

FIGURE 10 is a view in elevation of the embodiment of the toy illustrated in FIGURE 9 as it appears when it is collapsed to its launching status, and is surrounded by the elongated flexible launching member.

FIGURE 11 is a sectional view taken along line 11—11 in FIGURE 10.

FIGURE 12 is a view in elevation of yet another embodiment of the invention as the same appears when it is descending to the earth through the air.

FIGURE 13 is an elevational view of the embodiment of the invention illustrated in FIGURE 12 showing the toy in its collapsed status preparatory to launching.

FIGURE 14 is a sectional view taken along line 14—14 of FIGURE 13.

FIGURE 19 is a side elevational view of another embodiment of the invention as it appears in its expanded, descending position.

FIGURE 20 is a plan view of the embodiment of the invention illustrated in FIGURE 19 as it would appear if viewed from above during its descent.

FIGURE 21 is a sectional view taken along line 21—21 of FIGURE 20.

FIGURE 22 is a side elevational view of the embodiment of the invention illustrated in FIGURE 19 as it appears in its collapsed, launching status.

FIGURE 23 is a detail view illustrating the manner in which the vanes of the FIGURE 19 embodiment are pivotally attached to a wire ring functioning as the base member.

Figure 1:
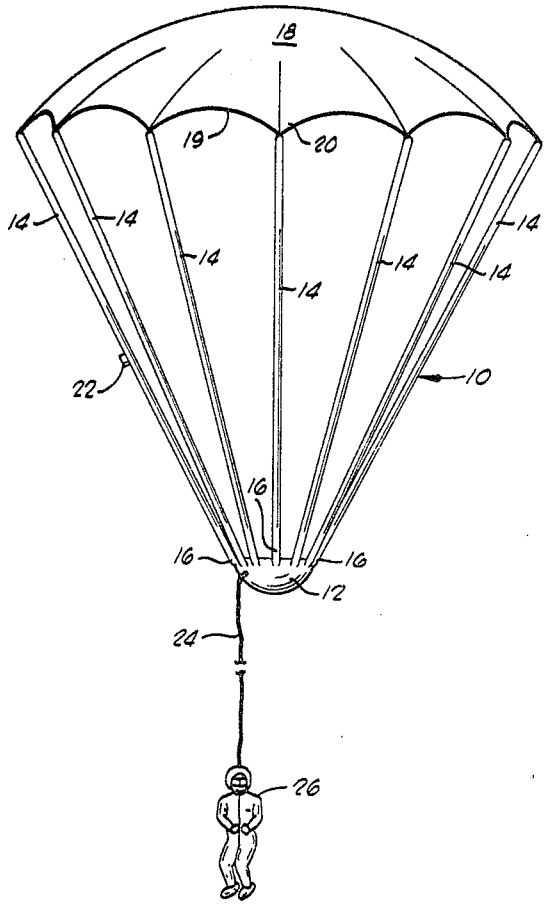
FIGURE 1 is a view in elevation of one embodiment of the invention as it appears after it has opened up or expanded during the descent of the aerial toy from a height to which it has been launched.
Figure 2:
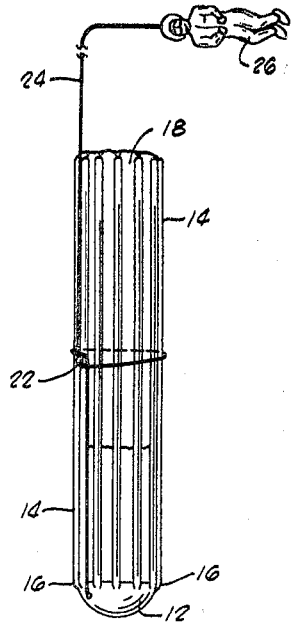
FIGURE 2 is a view in elevation of the embodiment of the toy illustrated in FIGURE 1 as it appears in its collapsed state ready for launching.
Figure 3:
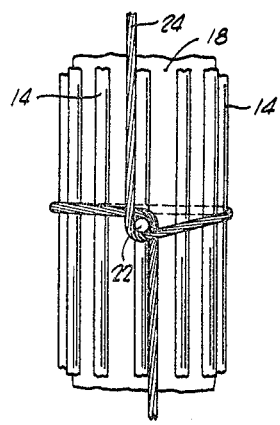
FIGURE 3 is an elevational view in detail showing the manner in which a retaining stud is utilized for engaging the elongated flexible launching member when the toy is in its collapsed condition preparatory to launching.

Referring now to the drawings in detail, and particularly initially to FIGURE 1, reference character 10 designates a multipart body which is made up of a plurality of parts which comprise, in the embodiment illustrated in FIGURES 1, 2 and 3, a base member 12 which is preferably frusto-spherical in configuration, and a plurality of elongated shroud members 14 which are each connected to the base member 12 by a flexible hinge portion 16. In a preferred method of constructing the toy, the shroud members 14, the base member 12 and the hinge portions 16 are integrally molded from a suitable plastic, and the resiliency of the plastic is such that the normal, unstressed, expanded position of the shroud members relative to the base member is that illustrated in FIGURE 1. When the shroud members 14 are distorted or bent from the expanded position illustrated in FIGURE 1, the resiliency of the hinge portions 16 which interconnect the shroud members to the base member 12 tends to bias the shroud members back into the expanded, unstressed position illustrated in FIGURE 1.

Secured to the upper ends of the several shroud members 14 is a flexible canopy 18, which suitably can be constructed of any flexible type of material. It will be noted that the flexible canopy is preferably generally circular in shape and is provided with a serrated or scalloped peripheral edge 19 providing a plurality of points 20 which are connected to the upper ends of the several shroud members 14. Secured to one of the shroud members 14 intermediate its length and projecting outwardly therefrom away from an imaginary vertical axis of symmetry surrounded by the conically grouped shroud members 14 is a retaining stud 22, the purpose of which will be hereinafter described in greater detail.

Secured at one of its ends to the base member 12 is an elongated flexible launching member 24 which can be constructed of thread, cord wire, or any other suitable member having sufficient flexibility to accomplish the functions hereinafter described. The elongated flexible launching member 24 is preferably of a length such that it can be extended completely around the several shroud members 14 when these members are folded into a collapsed, compact, adjacent status, as illustrated in FIGURE 2, and as hereinafter described in greater detail. Most preferably the elongated flexible launching member 24 has a length which is at least two and one half times the length of each of the shroud members 14. It should also be pointed out that, if desired, the elongated flexible launching member 24 can be resilient so as to permit the toy to be launched to a greater height in the manner hereinafter described. At its end opposite the end connected to the base member 12, the elongated flexible launching member 24 is preferably provided with a suitable handle which, in the illustrated embodiment of the invention, takes the form of a miniature aviator or parachutist 26.

In utilizing the embodiment of the invention illustrated in FIGURE 1, the flexible canopy 18 is folded or simply stuffed into the space defined by the expanded shroud members 14, and the shroud members are then forced into a compact, adjacent relationship to each other, the nature of which is illustrated in FIGURE 2. In this position, the shroud members 14 surround and enclose the flexible canopy 18 and provide a streamlined body offering very little resistance to the air during passage therethrough. When the shrouds 14 are in their compact, adjacent relationship, as illustrated in FIGURE 2, the resilient bias of the flexible hinge portions 16 tend to urge the shroud members 14 outwardly into their unstressed, expanded position. In order to retain the shroud members in their compact, adjacent relationship, a restraining force must be provided.

Retention of the shroud members in their compact, adjacent relationship is accomplished by extending the elongated flexible member 24 upwardly along the shroud members 14 from the base member 12, and then, at approximately midway of the length of the shroud members, forming a loop or convolution therearound with the flexible launching member. The flexible launching member convolution is retained in this position by either of three means as hereinafter described. In the embodiment of the invention illustrated in FIGURES 1–3, a retaining stud 22 is provided and, as illustrated in FIGURE 3, the elongated flexible launching member 24 is passed around the retaining stud 22 so that tension applied along the axis of the flexible launching member at the free end thereof will pull the flexible launching member against the retaining stud and hold the convolution in place around the folded shroud members 14. With the flexible launching member 24 in the position illustrated in FIGURE 2, the toy is ready for launching.

One alternative to the use of the retaining stud 22 is the provision of a notch or slot in one of the shroud members 14.

Launching is accomplished by gripping the handle 26 or free end of the flexible launching member 24 (when no handle is provided) in one hand and whirling the toy around in a circular motion. The centrifugal force thus developed firmly forces the flexible launching member 24 against the retaining stud 22 so that the convolution cannot slip off of the shrouds 14. During the proper time in the circular motion of the toy, it is released from the hand so as to shoot upwardly into the air under centrifugal force. The use of a resilient launching member will impart an added snap to the launching. The compact configuration of the toy at this time, and the fact that the major portion of the weight of the toy is concentrated in the base member 12 causes the toy to rise to a considerable height. Meantime, the tension in the flexible launching member 24 having been released, the shroud members 14 are permitted to respond to the biasing influence of the flexible hinge portions 16, and to diverge from each other in a direction so as to assume their relaxed, expanded positions, as shown in FIGURE 1 of the drawings.

I have found that the time required for the shrouds to overcome the resistance to expansion offered by the flexible launching member 24, and to return to their expanded state is substantially equivalent to that required for the toy to reach the maximum height to which it will normally be possible for a child to throw the toy. Thus, as the toy reaches the apex or zenith of its trajectory, the shroud members 14 are nearly expanded to their opened state, as illustrated in FIGURE 1, and the canopy has flared out of its position of maximum exposed area, also as shown in FIGURE 1. At this time, the concentration of weight in the base member 12 causes the toy to turn through 180° and to float downwardly to the earth in the position illustrated in FIGURE 1. It will be noted that the toy thus has a close resemblance to an actual parachute as it appears when descending from an airplane to the earth.

As another alternative to the use of the retaining stud 22 for retaining the convolution of the flexible launching member 24 in proper position, as herein described, the flexible launching member may be passed around the compact, adjacent shroud members 14 in a loop similar to that shown in FIGURE 2, and then a half hitch, such as that illustrated most clearly in FIGURES 10 and 13, utilized to retain the convolution in its initial position when tension is applied to the flexible launching member 24 from the free end thereof. The half hitch arrangement has been found to provide a slightly longer holding action than can be attained when a retaining stud of the type depicted is utilized so that the half hitch type of launching is preferred when the child is older and capable of throwing the toy to a greater height.

Figure 7:
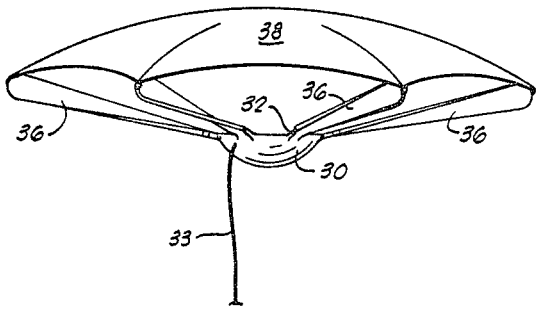
FIGURE 7 is an elevational view of an embodiment of the toy similar to that shown in FIGURE 4, but utilizing pitched, radial vanes for supporting a canopy closely above the base of the toy so that during the descent of the toy, a whirling or rotating motion is imparted to the toy.

The two closely similar embodiments of the invention illustrated in FIGURES 4, 5 and 6 and in FIGURES 7 and 8 will be conjointly considered, since the basic arrangement of elements in these two embodiments is essentially the same, and since the embodiments differ from each other in structure and function in only one major respect. Considering first FIGURES 4 and 7 conjunctively, these embodiments of the invention again include a base member 30 which has secured thereto through a plurality of flexible hinge portions 32, a plurality of divergent, outwardly extending, shroud members. The base member also has secured thereto an elongated flexible launching member 33 of the type heretofore described.

In the FIGURE 4 embodiment, these shroud members have been designated by reference character 34, whereas the shroud members in the embodiment shown in FIGURE 7 have been designated by reference character 36. It will be perceived in referring to these two figures that the only difference between the two types of shroud members which are provided is that the shroud members 34 in FIGURE 4 are substantially flat or monoplanar over their length, while the shroud members 36 of FIG- URES 7 and 8 are twisted or bent about a longitudinal axis so as to impart a pitch to the shroud members for a purpose hereinafter described.

The flexible hinge portions 32 which interconnect the shroud members 34 or 36 to the base member 30 function to retain the shroud members in the divergent expanded positions illustrated in FIGURES 4, 7 and 8, and to bias the shroud members to this position when they have been distorted or bent into a launching status, as hereinafter described. Preferably, the flexible hinge portions 32 are relatively thin sections constituting extensions of the shroud members which are employed and, in the most preferred construction of this embodiment of the invention, the base member 30, the hinge portions 32 and the shroud members 34 or 36 are integrally formed, a molded plastic construction being highly suitable and most economical of construction.

An important aspect of the embodiments of the invention illustrated in FIGURES 4 through 8 is the low profile of the toy in its expanded state. This is accomplished by forming the multipart body including the base member 30, hinge portions 32 and shroud members 34 or 36 so that the shroud members extend at an angle of at least 65°, and not more than 90°, to a vertical axis of symmetry passed through the base member 30 and corresponding to the axis of the imaginary conical geometric figure formed by the shroud members in their expanded positions.

Attached to the outer ends of all of the shroud members 34 or 36 is a flexible canopy 38 which can be constructed of the same material hereinbefore described as characterizing the flexible canopy 18. The angularity of the shroud members 34 and 36 with respect to the base member 30 is such that the canopy is positioned in its opened or flared state relatively close to the base member 30, and the appearance of the toy upon opening for descent to the earth is somewhat that of a flying saucer or science-fiction type spacecraft. The effect of the pitched shroud members 36 during such descent will be mentioned again later in the description of the invention.

To prepare the embodiment of the toy illustrated in FIGURES 4–8 for launching, the shroud members 34 or 36 are collapsed or forced against the bias of the flexible hinge portions 32 into a position similar to the position of the shrouds 14 shown in FIGURE 2. Thus, the shroud members 34 provided in the embodiment of the invention illustrated in FIGURE 4 are moved into the positions shown in FIGURES 5 and 6 preparatory to launching. The flexible canopy 38 is, of course, again positioned inside the collapsed shroud members 34 and is enclosed by the shroud members in the fashion illustrated in FIGURE 5.

The shroud members 34 of the embodiment of the invention illustrated in FIGURE 4 cooperate to form a completely closed chamber. This cooperation is perhaps best illustrated in FIGURE 6 where it will be noted that in the launching status of the shroud members 34, as illustrated in FIGURE 5, the shroud members abut against each other to form a hexagonally cross-sectioned chamber. This arrangement permits small objects, such as toy bombs, rockets, logistic supplies and the like, to be stored in the chamber thus formed during the launching of the device and retained therein by the flexible canopy 38 which is placed on top of such articles during the launching. Again, in FIGURE 5, it will also be noted that the flexible launching member 33 is used in substantially the same manner as has been described as characteristic of the flexible launching member 24 utilized in the embodiment shown in FIGURES 1–3. It is to be noted, however, that in the FIGURE 5 illustration of the launching status of the toy, the half hitch has been utilized for retaining the convolution or loop around the folded shroud members 34, instead of a retaining stud as is shown in use in FIGURES 2 and 3 of the drawings.

Where the pitched shroud members 36 are utilized, the toy appears from below upon its descent through the air as shown in FIGURE 8 of the drawings. The pitch in the shroud members 36 permits them to function as pitched vanes which are acted on by air moving thereagainst as the toy descends through the air and the result is that a rotary motion is imparted to the toy which is in keeping with its low profile, and simulation of a flying saucer type device.

Yet another type of toy constructed in accordance with the basic principles of this invention is illustrated in FIGURES 9 and 10. In referring to these figures, it will be noted that the multipart body 50 includes two arcuately-shaped, hollow body halves 52 and 54. The body halves 52 and 54 are each provided with an enlarged midsection and two opposed, relatively smaller end portions 56 and 58. The two body halves 52 and 54 are joined at their end portions 56 by a resilient hinge 60 which preferably is recessed into the surface of the end portions 56 of the two body halves so as to protect the hinge from the impact imparted to the toy when it strikes the ground upon returning to the earth. The resilient hinge 60 is preferably formed integrally with the body halves 52 and 54, as hereinbefore described, with the entire multipart body being molded from plastic. The hinge 60 functions to bias the body halves 52 and 54 to the opened or expanded position illustrated in FIGURE 9.

Extending around each of the body halves 52 and 54 are a pair of aligned indexing grooves 62 which form an annular groove encircling the multipart body when the two body halves 52 and 54 are forced into their compact, aligned launching positions illustrated in FIGURE 10. The function of the indexing groove 62 will be hereinafter explained.

Secured to the end 56 of one of the body halves 52 or 54 is an elongated flexible launching member 64. The elongated flexible launching member 64 is preferably of a length which is about two and one-half times the length of the body halves 52 and 54, and may carry at the free end thereof, a handle similar to the handle 26 illustrated in FIGURE 1. It should be pointed out, however, that the required minimum length of the launching member 64 is simply sufficient length to extend across the junction line between the body halves 52 and 54 when they are folded into their adjacent launching position. A notch (not shown) can then be provided on one of the body halves to receive the launching member and permit it to be utilized to retain the body in its collapsed launching position. Shroud lines 66 formed from a plurality of strings or other flexible members are attached to the resilient hinge 60, or to one of the body halves 52 and 54 at a point relatively close to the hinge 60 and are attached at their other ends to the points 67 defined by the scalloped peripheral edge 68 of a flexible canopy 70.

When the embodiment of the invention illustrated in FIGURES 9–11 is to be launched, the flexible shroud lines 66 and the flexible canopy 70 are collapsed or wadded up and placed inside the hollow chamber which is defined by the two body halves 52 and 54 when they are forced into their compact, adjacent abutting relation illustrated in FIGURES 10 and 11. In referring to FIGURE 11, it will be noted that the body halves 52 and 54 cooperate when in contact with each other to form a circularly cross-sectioned chamber which includes sufficient volume to enclose the flexible canopy 70 and the flexible shroud lines 66 therewithin. The chamber formed by the two adjacent body halves 52 and 54 also can accommodate other items which the child may wish to have dropped from the toy once it opens up at the top of its trajectory for descent to the ground, such articles including toy bombs, logistic supplies for an air drop to toy troops on the ground, or other similar items.

When the body halves 52 and 54 are forced into their abutting launching status, the flexible launching member 64 is extended upwardly along the closed housing formed by the body halves and is wrapped around the two body halves, using the indexing grooves 62 as a guide for the proper location to form the convolution around the body halves, and also as an engaging instrumentality to prevent the flexible launching member from slipping along the body halves to an undesirable position preparatory to, or during, the launching. Again, in FIGURE 10, the convolution of the flexible launching member 64 around the two body halves 52 and 54 is retained in position by the use of a half hitch.

The embodiment illustrated in FIGURES 9–11 is launched in substantially the same fashion as has been described with respect to the embodiment shown in FIGURES 1–3. Tension applied to the free end of the flexible launching member 64 retains the convolution in tight gripping engagement with the body halves 52 and 54, and functions in retaining the body halves in their cooperating closed relationship against the bias of the resilient hinge 60 until the rocket-shaped multipart body reaches the apex or zenith of its trajectory. The bias of the resilient hinge 60 then forces the body halves toward their expanded, divergent positions, as illustrated in FIGURE 9. It will be noted in referring to FIGURE 9 that the indexing grooves 62 then assume a position in which the convolution of the launching member 64 will be slipped out of the groove and will move toward the ends 56 of the body halves 52 and 54. In moving in this direction along the body halves, the convolution of the flexible launching member 64 tends to fall away from the body halves and all constraining effect of the launching member is thereby eliminated. As the body halves 52 and 54 open to their divergent relationship, the flexible canopy 70 billows outwardly and assumes the position of maximum exposed surface area shown in FIGURE 9. In this status, the device can descend gently and slowly to the earth.

Yet another embodiment of the invention is illustrated in FIGURES 12, 13 and 14. This embodiment utilizes substantially the same principles which have been described with respect to the other embodiments of the invention. The form of the multipart body utilized in this embodiment is, however, different from the multipart bodies of the embodiments hereinbefore described, and is intended to simulate a type of space capsule which has been heretofore utilized in the Gemini and Mercury manned space programs of the United States. In referring to FIGURE 12, it will be noted that the multipart body 80 includes two identical body halves 82 and 84 each of which comprises a semi-frusto-conical hollow base portion 86 and a generally semi-cylindrical hollow neck portion 88 which is secured to the small end of the semi-frusto-conical base portion. If desired, a pair of circumferential indexing grooves 89 can be formed around the outside of the base portions 86 for the purpose hereinbefore described. A resilient hinge 90 is provided at the ends of the semi-cylindrical hollow neck portions 88 and 90 interconnects the two body halves 82 and 84. The resilient hinge 90 functions to bias the body halves 82 and 84 to an expanded or divergent position, as illustrated in FIGURE 12. Flexible shroud lines 92, such as strings, are secured at one of their ends to the resilient hinge 90, or to the semi-cylindrical hollow neck portions 88 adjacent the hinge 90. The flexible shroud lines 92 are attached to the points 93 defined by the scalloped peripheral edge 94 of the flexible canopy 96.

Preparatory to launching, the canopy 96 and the flexible shroud lines 92 are folded into a compact status and are placed within the two body halves 82 and 84 which are forced into an abutting complementary relationship as shown in FIGURES 13 and 14 to define a hollow chamber. The flexible launching member 98 is then extended upwardly along the body halves and is looped in a convolution around the semi-frusto-conical base portions 86 and formed in a half hitch, as illustrated in FIGURE 13. The toy is then launched in substantially the same manner as hereinbefore described.

It should be pointed out that, in some instances, it may be desirable to use a combination of rigid and flexible shroud members. For example, a canopy having flexible lines attached thereto and adapted to be attached to rigid shroud members can present several options in the use of the toy.

Figure 15:
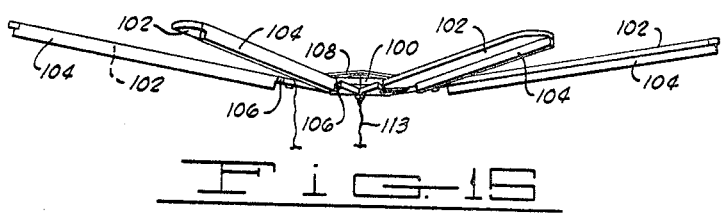
FIGURE 15 is a side elevational view of yet another embodiment of the invention as it appears in its expanded, descending position.
Figure 16:
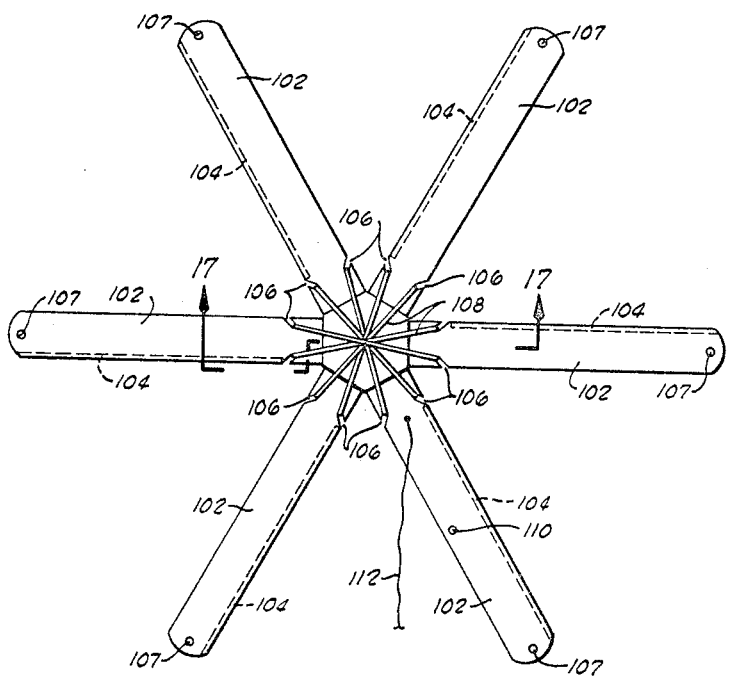
FIGURE 16 is a plan view of the embodiment of the invention illustrated in FIGURE 15 as it would appear from above during its descent.
Figure 18:
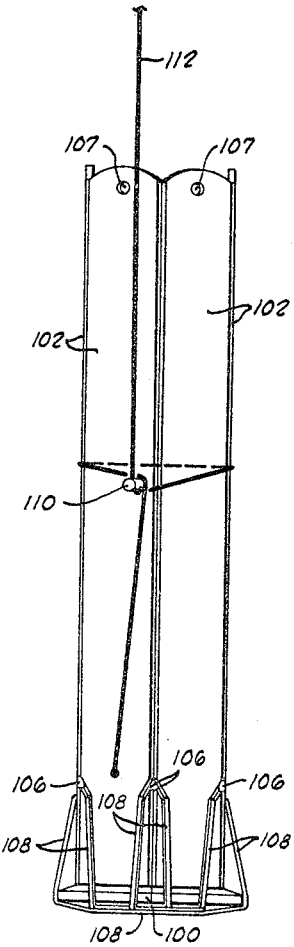
FIGURE 18 is a side elevational view of this embodiment of the invention as it appears in its collapsed, launching status.

Yet another embodiment of the invention is illustrated in FIGURES 15 through 18. In this embodiment, the aerial toy includes a hexagonally shaped base member 100 which is characterized in having a relatively flat upper surface and a relatively flat lower surface. The lower surface is tapered upward slightly toward the upper surface adjacent the outer peripheral edge of the base member 100. Secured to the lower surface of the base member 100 and extending radially outwardly from the base member are a plurality of elongated vanes 102. Each of the vanes 102 includes a relatively thin inner end 104 which is secured by a suitable adhesive or other means to the lower surface of the base member 100, and which is of sufficiently thin cross section to permit the respective vane to be pivoted from a radially outwardly extending position as shown in FIGURES 15 and 16 to a collapsed launching position as shown in FIGURE 18. Each of the vanes 102 further includes a depending, elongated flange 104 which is secured at a right angle to one of the longitudinal edges of the vane and functions as hereinafter described to impart a rotary movement to the aerial toy as it descends to the ground after it has been launched.

Relatively close to the end portion 104 of each of the vanes 102, each vane carries a pair of slots 106 extending inwardly from the opposed longitudinal edges thereof. The slots 106 in the vanes receive a rubber band 108 or other resilient biasing member, with a single rubber band being extended between each pair of opposed vanes 102 in the manner best illustrated in FIGURES 16 and 17. On one of the vanes 102, a short protuberance or stud 110 is formed and projects from the vane to provide a point of temporary securement for an elongated flexible launching member 112 which is secured to one of the vanes adjacent the base portion 100. The lower surface of the base member 100 is beveled or tapered slightly toward the upper surface adjacent the outer edge of the base member so that the rubber bands 108 can bias the vane 102 to a slightly upwardly extending position so that a slight amount of dihedral characterizes each pair of aligned vanes.

Figure 17:
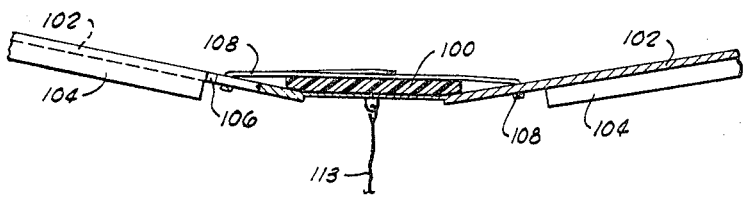
FIGURE 17 is a sectional view taken along line 17—17 of FIGURE 16.

In the operation of the embodiment of the invention illustrated in FIGURES 15 through 18, the vanes 102 are initially folded downwardly toward the bottom to the page of drawings from the position which they are shown as occupying in FIGURE 17. By such folding action, the vanes 102 are brought into parallel juxtaposition as shown in FIGURE 18 in which position they form a closed, elongated chamber of hexagonal cross section. A small figure, such as a miniature parachutist or astronaut, may be attached to a string 113 connected to the center of the base member 100 and enclosed within the chamber formed by the folded vanes 102 preparatory to the launching.

After the vanes 102 have been folded to the position illustrated in FIGURE 18, the flexible launching member 112 is wrapped or passed around the vanes and is looped over the stud 110. The free end of the flexible launching member 112 is then extended toward the free ends of the folded vanes 102 and the toy is launched in the manner hereinbefore described.

The convolution of the flexible launching member 112 which surrounds the vanes 102 will be sufficient to prevent the vanes from being biased outwardly to their radially extended position shown in FIGURE 17 during the launching of the toy. Toward the apex or zenith of the trajectory of the toy, however, the flexible launching member 112 will be forced by the biasing influence of the rubber bands 108 to fall away and release the vanes 102 from confinement. The bands 108 will then cause the vanes 102 to move through an angle of slightly more than 90° to the outwardly extending position illustrated in FIGURES 15 and 16. This position will be attained by the vanes at or near the top of the trajectory of the toy, and, in this embodiment of the invention, as contrasted with those previously described, the toy need not turn through 180° and commence its descent before the braking effect of the extended vanes becomes operative. With the vanes 102 extended radially outwardly from the base member 100 in the manner illustrated in FIGURES 16 and 17, the toy will commence to whirl or undergo a rotary motion due to the resistance to the flow of air offered by the downwardly depending flanges 104. It will be noted that the relative position of each of the flanges 104 on its respective vane 102 is the same in the case of each of the vanes, and the effect of this arrangement is to cause the toy to spin as it passes downwardly through the air in the same manner as spin would be imparted to a pitched propeller as a result of the impingement of air currents thereon.

As an optional use of the top depicted in FIGURES 15–18, a flexible canopy of the type hereinbefore described can be connected through flexible shroud lines not shown to the outer end of each of the vanes 102, using the apertures 107 for connecting one end of the shroud lines. In this arrangement, the parachute can be folded flatly against the side of the collapsed vanes preparatory to launching the toy, and can be secured in this position by the use of the flexible launching member 112.

Another embodiment of the invention is illustrated in FIGURES 19–23. This embodiment is generally similar in its operation to the embodiment illustrated in FIGURES 15–18 and described in the immediately preceding discussion. The construction of this embodiment of the invention differs slightly from that shown in FIGURES 15–18, however, and brief reference will be made to the differences in construction as they are depicted in the drawings. The base member 100 illustrated in FIGURES 15–18 has been replaced in the FIGURE 19–23 embodiment with a continuous, generally hexagonally shaped wire ring 120. To each side of the wire 120 is attached a vane designated generally by 124. Each of the vanes 124 has a small aperture 126 formed at the outer end thereof for the optional attachment of a flexible canopy or other parachute-type structure. Each vane 124 also is provided with a depending, longitudinally extending flange 128 which is secured at right angles to the respective vane along one longitudinal edge thereof. A stud 130 is provided on one of the vanes 124 for use in attaching a flexible launching member 132 in the same fashion as has been hereinbefore described.

For the purpose of attaching each of the vanes 124 to the wire ring 120, each vane carries a resilient socket portion 132 formed at the inner end of the vane and dimensioned to resiliently grip the wire ring 120 in the manner best illustrated in FIGURE 21. Each of the vanes 124 is also provided with an inwardly extending stop portion 136 which projects at a slight angle with respect to the major plane of the vane and is tapered evenly from both of its side edges to a point at its inner end as indicated by reference character 138. Each of the stop members 136 also has formed therein an inwardly inclined slot 140. The slots 140 in the vanes 124 receive in a continuous elastic member such as a rubber band 142 which functions in the operation of the device to bias the vanes 124 to the positions which they are shown occupying in FIGURES 20 and 21. A string 144 or other suitable flexible member is provided for attaching a small figure of an aviator or astronaut to one of the stop members 136.

In the operation of the embodiment of the toy illustrated in FIGURES 19–23, the vanes 124 are first folded downwardly through slightly more than 90° from the position which they are shown as occupying in FIGURES 20 and 21. Thus, the toy appears as shown in FIGURE 23 when it is completely collapsed to its launching position. In this position of the toy, the rubber band 142 is placed in tension and exerts a constant bias on the vanes 124 tending to cause them to pivot or rotate about the wire ring 120 to its expanded position in which the vanes extend radially outwardly from the wire ring. After the toy has been launched in the manner hereinbefore described, the vanes 124 spring outwardly and are pivoted by the rubber band 142 until the stop members 136 abut against each other, as best illustrated in FIGURES 20, 21 and 22. The further motion of the vanes is then arrested and the toy can descend with substantially the same motion as has been described as characterizing the embodiment of the invention illustrated in FIGURES 15–18. The FIGURE 19–23 embodiment of the invention presents the same advantage in its operation as that which characterizes the FIGURE 15–18 embodiment in that it is unnecessary for the toy to turn completely through 180° before opening out to its expanded status preparatory to commencing its descent.

From the foregoing description of the invention, it will have become apparent that the present invention provides a novel, amusing and simply constructed aerial toy which can be operated by children of a variety of ages. The toy is sturdily constructed and functions reliably in continued operation.

I claim:
1. An aerial toy comprising:
   a multi-part body which includes a base member forming one end of said body and a plurality of elongated, relatively rigid, substantially equi-length shroud members formed integrally with said base member, and as formed, and in their relaxed, unstressed state, extending divergently with respect to each other and radially with respect to said base member, each of said shroud members including, as a portion thereof disposed toward the end of the respective shroud member adjacent said base member, an integrally formed, flexible, resilient hinge portion, said shroud members being foldable against the bias of said flexible resilient hinge portions to a compact, adjacent relationship in which said shroud members extend substantially parallel to each other;
   an elongated flexible launching member having one end connected to said base member and the other end free, said launching member having a length sufficient to permit said launching member to be wrapped around the outside of said shroud members when they are in their compact, adjacent, substantially parallel relationship, and yet to extend from the base member at one end of the multi-part body past the free ends of said shroud members whereby said launching member can be utilized to maintain said shroud members in their compact, adjacent positions during the upward launching of said aerial toy; and
   flexible canopy means secured to all of said elongated shroud members and expandable to provide a large, exposed surface area when said shroud members are in their expanded, divergent positions, and collapsible to a folded position enclosed within, and surrounded by, said shroud members when said shroud members are forced against the bias of said flexible resilient hinge portions into said compact, adjacent relationship in which said shroud members extend substantially parallel to each other.

2. An aerial toy as defined in claim 1 wherein said shroud members are symmetrically positioned about an axis extending through said base member, and each shroud member defines an angle of less than 90° and more than 65° with said axis when said shroud members are in their expanded, divergent position, said shroud members each extending upwardly at an angle of less than 25° with respect to a plane passed through the center of said base member, which plane would contain said shroud members if said shroud members were pivoted into a common plane and were extended radially from said base member.

References Cited

UNITED STATES PATENTS

| | | |
|---|---|---|
| 728,251 | 5/1903 | Lawrence. |
| 757,247 | 4/1904 | Altermatt. |
| 887,548 | 5/1908 | Trumble _____ 16—189 |
| 930,452 | 8/1909 | Zook _____ 46—86 |
| 1,835,717 | 12/1931 | Moore _____ 46—86 |
| 2,126,156 | 8/1938 | Vogt _____ 46—86 |
| 2,380,278 | 7/1945 | Weissman. |
| 2,765,582 | 10/1956 | Hurtado _____ 46—80 |
| 3,134,194 | 5/1964 | Boswell. |

FOREIGN PATENTS

| | | |
|---|---|---|
| 52,261 | 9/1936 | Denmark. |
| 1,045,298 | 11/1958 | Germany. |

LOUIS G. MANCENE, *Primary Examiner.*

C. R. WENTZEL, *Assistant Examiner.*